United States Patent [19]

Nishikawa et al.

[11] Patent Number: 4,505,351
[45] Date of Patent: Mar. 19, 1985

[54] AUTOMATIC BRAKING SYSTEM FOR VEHICLES

[75] Inventors: Masao Nishikawa, Tokyo; Takashi Aoki, Saitama, both of Japan

[73] Assignee: Honda Giken Kogyo Kabushiki Kaisha, Tokyo, Japan

[21] Appl. No.: 317,112

[22] Filed: Nov. 2, 1981

[30] Foreign Application Priority Data

Nov. 4, 1980 [JP] Japan ................. 55-155028
Dec. 26, 1980 [JP] Japan ................. 55-186279

[51] Int. Cl.³ ............................................. B60T 8/04
[52] U.S. Cl. ................................. 180/169; 91/367;
188/106 P; 303/114
[58] Field of Search ............. 180/169; 188/106 R,
188/106 P; 303/114, 115, 100; 340/53; 343/7
VM; 91/367, 453

[56] References Cited

U.S. PATENT DOCUMENTS

| | | | |
|---|---|---|---|
| 3,795,426 | 3/1974 | Sisson .................. | 180/169 |
| 3,972,382 | 8/1976 | Takayama et al. ......... | 180/169 |
| 4,073,359 | 2/1978 | Fujika et al. ........... | 180/169 |
| 4,079,802 | 3/1978 | Kawata ................... | 180/169 |
| 4,350,077 | 9/1982 | Takeuchi ................. | 91/376 R |

*Primary Examiner*—David M. Mitchell
*Attorney, Agent, or Firm*—Irving M. Weiner; Pamela S. Burt

[57] ABSTRACT

An automatic braking system for a vehicle including an automatic command system giving a command including at least one braking signal of a level in response to the need for braking, a fluid pressure source, a braking device having an input member which is manually actuatable, and a device for actuating the input member by applying thereto a fluid pressure from the pressure source in response to the level of the braking signal.

An automatic braking may thus be performed while permitting manual braking to be simultaneously effected.

7 Claims, 10 Drawing Figures

AUTOMATIC BRAKING SYSTEM FOR VEHICLES

BACKGROUND OF THE INVENTION

1. Field of the Invention

The present invention relates to an automatic braking system for vehicles.

More particularly, the present invention relates to an automatic braking system for a vehicle of the type in which a manually operable braking system of the vehicle is controllable with at least one braking signal given in response to the need for braking.

2. Description of Relevant Art

There have been proposed a variety of automatic braking systems for vehicles including an automatic braking system for a vehicle in which the distance and relative velocity between the vehicle and a significant obstacle moving or standing ahead thereof such as a nearest preceding vehicle are always measured by means of radar or such, to thereby effect a braking of the vehicle in accordance with the possibility of collision of the vehicle with the obstacle.

In such conventional automatic braking system, there has been a desideratum such that, due to the increasing market demands for inexpensive, small-sized and lightweight vehicles with superior driving characteristics and sufficient safety and in considering the relatively rare instances in which the automatic braking in accordance with the possibility of collision is needed to be effected, it has been desired to constitute in a possibly simplified manner an automatic braking system including a minimal number of components and employing the existing components such as a braking pedal, a pedal force multiplying device and a power steering system of the vehicle with minimum modification, as necessary, while allowing same to be manually operable with their inherent operational feeling maintained and, when necessary, to have such manual braking operation prevail over the automatic control in addition to effecting such automatic braking step by step in response to the need for braking.

SUMMARY OF THE INVENTION

The present invention has been provided in order to fulfill the aforesaid desideratum attendant conventional automatic braking systems.

It is an object of the present invention to provide an automatic braking signal for a vehicle in which an automatic braking is effected in response to the need for braking, while permitting a manual braking operation to be performed simultaneously when necessary.

It is another object of the present invention to provide an automatic braking system for a vehicle in which such automatic braking is effected in a step-by-step manner.

It is still another object of the present invention to provide an automatic braking system having favorable characteristics with respect to energy saving.

Therefore, the present invention provides an automatic braking system for a vehicle comprising an automatic command system giving a command including at least one braking signal of a level in response to the need for braking, a fluid pressure source, a braking device having an input member which is manually actuatable, and means for actuating the input member by applying thereto a fluid pressure from the pressure source in response to the level of the braking signal.

According to the invention, there is provided the advantage that an automatic braking may be performed while permitting a manual braking to be simultaneously effected.

The above and other objects and advantages of the invention will become apparent from the following description with reference to the accompanying drawings.

DETAILED DESCRIPTION OF THE PREFERRED EMBODIMENTS

Figure 1:
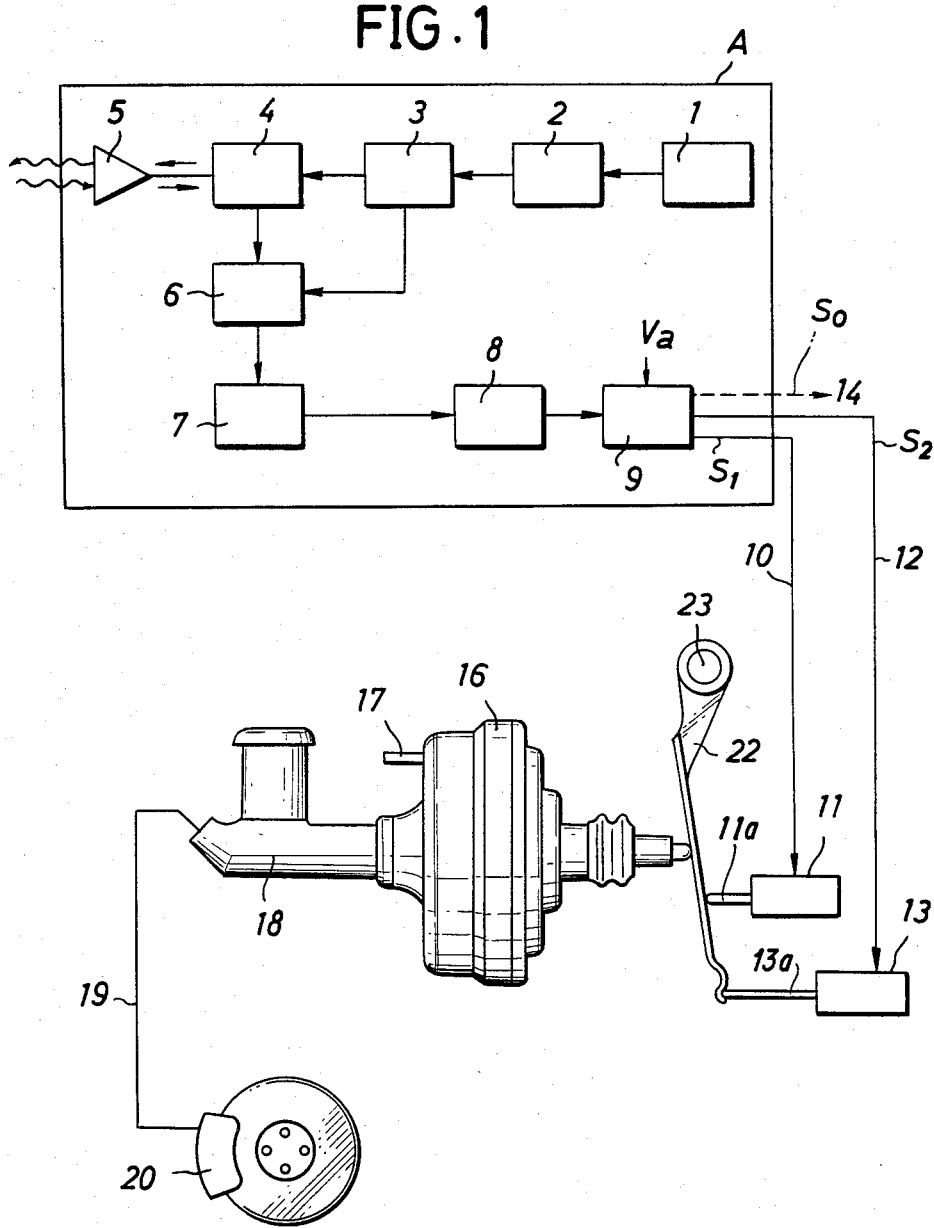
FIG. 1 is a schematic illustration of an automatic braking system according to a first embodiment of the invention.

For ease of description, reference is first generally made to all figures of the accompanying drawings, wherein FIGS. 1 to 8 are related to the first embodiment of the invention, while the first and second modified examples of the first embodiment are respectively shown in FIGS. 7 and 8, and FIGS. 9 and 10 show the second embodiment of the invention. Throughout the drawings, like reference characters designate like or corresponding parts.

Referring now to the first embodiment of the invention shown in FIGS. 1~6, particularly to FIG. 1, the automatic braking system for a vehicle includes an automatic command system A which automatically measures the actual distance Da and relative velocity Vr between the vehicle provided with this braking system and a significant obstacle moving or standing ahead thereof, such as a nearest preceding vehicle, to thereby analyze the possibility of collision therebetween and, when this possibility exceeds a predetermined extent, gives a command to effect a step-by-step braking of the vehicle in accordance with the possibility of collision.

In this embodiment, as in the later-described second embodiment of the invention, system A comprises an FM-CW radar system for the measurement of distance Da and relative velocity Vr. System A includes an oscillator 1 generating a carrier wave frequency-modulated at a constant rate by a modulator 2 and conducted through a directional coupler 3 and a circulator 4 to an antenna 5 which in turn transmits from the transmission side the frequency-modulated continuous wave and receives with the reception side an echo from the obstacle such as a preceding vehicle. This echo is sent through circulator 4 to a mixer 6 and mixed therein with the frequency-modulated carrier as sent from directional coupler 3, to thereby obtain a beating mixed wave which is amplified and filtered into a beat frequency signal through a video amplifier 7 followed by a frequency counter 8 counting the frequency of the beat signal, the frequency carrying information on distance Da and relative velocity Vr.

Counter 8 is then interrogated for the beat frequency from a signal processor 9 which is responsible for presenting the command to effect the step-by-step braking. The command comprises at least one critical signal or a plurality of signals to be transmitted in response to the possibility of collision of the vehicle with the obstacle. In consideration of the desired simplification of structure and ease of manufacture, in this embodiment there are preferably employed three signals given in the form of voltage in response to the need of braking, namely, a light braking signal $S_1$ and a strong braking signal $S_2$ in addition to an annunciatory signal $S_0$.

As a self-complete circuit to perform such presentation of the command, signal processor 9 calculates distance Da and relative velocity Vr from the beat frequency and concurrently interrogates a speedometer and/or other suitable devices for the absolute velocity Va of the vehicle, thus obtaining a velocity difference Va-Vr corresponding to the absolute velocity of the obstacle. By feeding such information on velocity to a characteristic function circuit (not shown) incorporated in processor 9, there is given a recommendable distance Dr between the vehicle and obstacle in the form of a signal on a real time base, which distance Dr is compared with the actual distance Da in the form of a difference $X = Dr - Da$. When difference X exceeds a first critical value $X_1$, processor 9 outputs the light braking signal $S_1$ through a signal line 10 to a solenoid 11 for light braking. If difference X becomes still larger to exceed a second critical value $X_2$, processor 9 sends the strong braking signal $S_2$ through a signal line 12 to a solenoid 13 for strong braking. Even in a state where X is smaller than $X_1$, if it is still larger than a reference value $X_0$ determined for safe driving in accordance with the situation in which the vehicle is placed, then the annunciatory signal $S_0$ is transmitted from processor 9 through a signal line 14 to an instrument (not shown) for annunciation of the potential necessity of braking. Signal $S_0$ may be applied to an automatic navigation system or used for an automatic throttling of an engine of the vehicle.

As schematically shown in FIG. 1, the automatic braking system comprises as the actuator thereof a pedal force multiplying device 16 of a vacuum type having on the front side an air outlet hose adapter 17 for evacuation connected with a hose (not shown) to an intake manifold (not shown) of the vehicle. Provided at the rear side of device 16 is a lever 22 pivotable about an automatic pivot shaft 23 secured to a body of the vehicle. Lever 22 moves clockwise in FIG. 1 to a first extent when signal $S_1$ is applied to solenoid 11, and further to a second extent when signal $S_2$ is applied to solenoid 13, thus giving a step-by-step varying force to device 16. The force is intensified in device 16 to operate a master cylinder 18 connected through a hydraulic line 19 to a local cylinder 20 provided at each of the road wheels to be braked.

Figure 2:
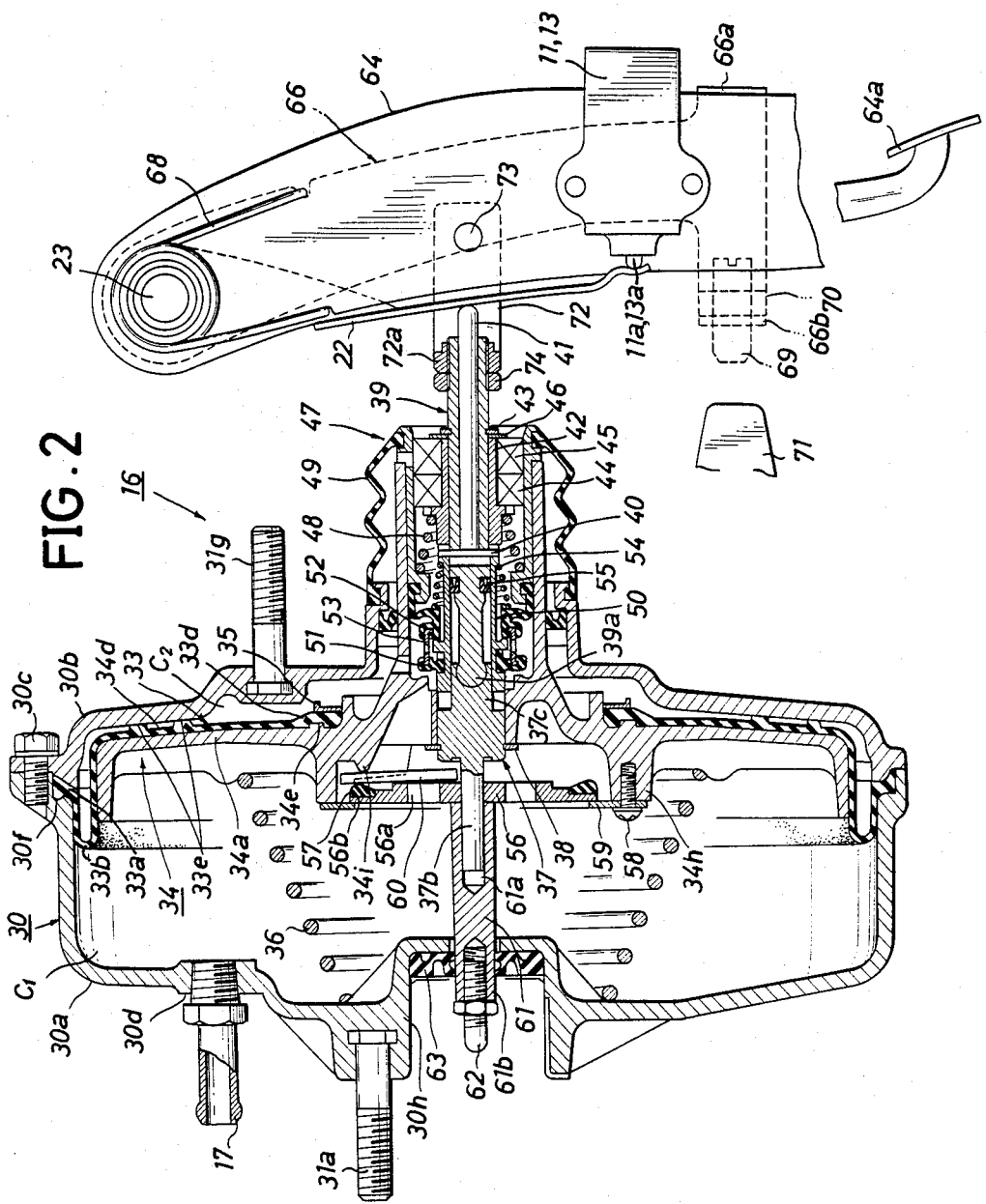
FIG. 2 is a longitudinal section showing a pedal force multiplying device and a braking device of the automatic braking system of FIG. 1.
Figure 3:
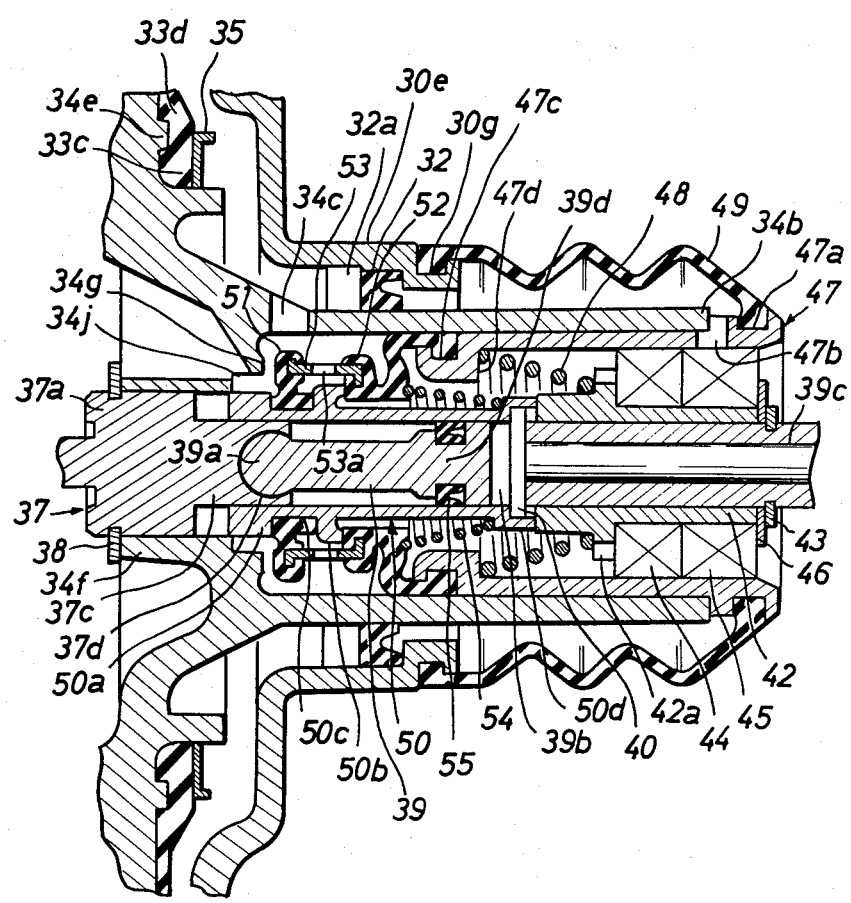
FIG. 3 is an enlarged partial detailed view of the multiplying device of FIG. 2.

Referring to FIGS. 2~6, particularly to FIGS. 2 and 3, the multiplying device 16 comprises a short cylindrical casing 30 consisting of flat bowl-like front and rear casings 30a, 30b having respective circumferential flanged portions jointed with each other by using a number of bolts 30c arranged at a suitable pitch. Front casing 30a is provided on the front side with a stud bolt 31a supporting master cylinder 18, and rear casing 30b has on the rear side thereof a stud bolt 31a secured to a toe board (not shown) of the vehicle body. On the upper part of the front face of front casing 30a, there is formed an adapter seat 30d for the hose adapter 17 which is screwed therethrough to be in free communication with the inside of front casing 30a.

In casing 30, there is longitudinally slidably provided piston 34 having a disc portion 34a totally accommodated in casing 30 and a rear cylindrical portion 34b formed to be integral with disc portion 34a and adapted to extend rearwardly through and to project outside of a rearwardly projected cylindrical portion 30e of rear casing 30b. Between cylindrical portion 34b of piston 34 and cylindrical portion 30e of rear casing 30b, there is airtightly interposed a rubber-like elastic seal ring 32 prevented from slip-away by a stop ring 32a guiding cylindrical portion 34b. This cylindrical portion 34b has in its upper front portion thereof a plurality of small holes 34c formed to allow free communication therethrough.

Adhered to a rear surface 34d of disc portion 34a of piston 34 is an airtight elastic membrane 33 having an outer circumferential edge 33a pressed to be fixed in a circumferential slot 30f formed in the inside of casing 30, a circumferential slack portion 33b folded into a substantially U-shaped form permitting a smooth longitudinal movement of piston 34, and an inner circumferential portion 33c formed on the front side with a circumferential recess 33d engaged with a rearwardly projected small portion 34e of disc portion 34a of piston 34 and prevented at the rear side from slip-away by using a stop ring 35. In such manner, the inner space of casing 30 is separated by membrane 33 and disc portion 34a of piston 34 into front and rear chambers $C_1$, $C_2$. In front chamber $C_1$, a spring 36 is compressed to be interposed between front casing 30a and disc portion 34a of piston 34, thus normally biasing piston 34 rearwardly so that, in the normal state of pedal force multiplying device 16 as shown in FIG. 2, piston 34 is placed at its rearmost position thereof, with a plurality of semi-circular small convex portions 33e of the rear surface of membrane 33 all brought into contact with the inner front wall of rear casing 30b.

The central front side of disc portion 34a of piston 34 is rearwardly recessed to define a longitudinally extending small cylindrical portion 34f which is hollow so as to have a reaction rod 37 provided therethrough. Reaction rod 37 has an axially central large diameter portion 37a slidably fitted in small cylindrical portion 34f of piston 34, and front and rear small diameter portions 37b, 37c extending forwardly and rearwardly, respectively, from large diameter portion 37a. Large diameter portion 37a has a snap ring 38 fixedly fitted thereon which, when reaction rod 37 is pushed rearwardly, abuts on the front end of small cylindrical portion 34f of piston 34, thus restricting reaction rod 37 from further rearward movement with respect to piston 34. Rear small diameter portion 37c of reaction rod 37 has the rear end surface thereof formed with a substantially semi-spherical recess 37d.

In recess 37d there is rotatably engaged a ball joint 39a formed at the front end of a manual input rod 39 extending coaxially relative to and projecting outside of rear cylindrical portion 34b of piston 34. Manual input rod 39 is formed at the axially central portion thereof with an axially loose radial through-hole 39b having a pin 40 provided therethrough so as to be movable along the axial length of through-hole 39b. Rod 39 is further formed between the rear end thereof and through-hole 39b with an axial hollow portion 39c so as to be substantially hollow, and has an automatic input rod 41 slidably provided therethrough and adapted to abut at the front end against pin 40 and at the rear end on the lever 22.

Manual input rod 39 is fitted in an axial sleeve 42 having on the front side a circumferential flanged portion 42a normally biased rearwardly with a return spring 48 compressed to be interposed between flanged portion 42a of sleeve 42 and a front stepped portion 47d of a cylindrical spring retainer 47 pressed tight in rear cylindrical portion 34b of piston 34. On sleeve 42 there is fitted a sleeve guide 44 and an air filter 45 in close contact with guide 44, both slidably fitted in spring retainer 47 and fixed between flanged portion 42a of sleeve 42 and a stop member 46 which is provided at the rear end of sleeve 42 and stopped by a snap ring 43 secured to manual input rod 39. Sleeve guide 44 has an element or configuration permitting a free axial communication of air through guide 44 itself.

Spring retainer 47 is formed in the rear part thereof with a circumferential slot 47a and a plurality of communication holes 47b and in the front part thereof with a circumferential slot 47c. Between rear circumferential slot 47a of retainer 47 and a circumferential slot 30g formed in the rear part of cylindrical portion 30e of rear casing 30b, there is provided an elastic dust boot 49 having the front and rear edges thereof engaged in slots 30g and 47a, respectively, and having the intermediate portion therebetween corrugated to be capable of extension and contraction with the aid of communication holes 47b.

In rear cylindrical portion 34b of piston 34, there is coaxially provided a poppet type control valve mechanism comprising a cylindrical slide valve 50 axially slidably fitted at the front side on rear small diameter portion 37c of reaction rod 37 and at the rear side on the front part of manual input rod 39. Slide valve 50 has, in the front part thereof, first and second flange portions 50a, 50b formed thereon at the front end of valve 50 and at a position axially rearwardly spaced therefrom, respectively, and a circumferential slot 50c defined by flange portions 50a, 50b. The control valve mechanism further comprises rubber-like first and second elastic annular valve members 51, 52 to be seated, in their closed positions, on a circumferential projection 34g formed at the base of rear cylindrical portion 34b of piston 34 and on the rear circumferential edge of second flange portion 50b of slide valve 50, respectively. First valve member 5 has the inner circumferential edge thereof tightly engaged in slot 50c of slide valve 50, and second valve member 52 has the rear circumferential edge thereof tightly engaged in slot 47c of spring retainer 47. Between the outer circumferential edge of first valve member 51 and the front circumferential edge of second valve member 52, there is interposed an annular bridge 53 having a plurality of communication holes 53a formed therethrough at a proper pitch.

In the above construction, a compressed spring 54 is interposed between second valve member 52 and a rear enlarged portion 50d of slide valve 50, thus normally biasing valve member 52 in the closed direction thereof. Enlarged portion 50d of slide valve 50 has the inside thereof radially outwardly stepped to receive pin 40 and the rear end thereof abutting on the front end of sleeve 42 in the normal state. First flange portion 50a of slide valve 50 has its outer circumference partially fitted in small cylindrical portion 34f of piston 34, with a proper play left between the rear end of large diameter portion 37a of reaction rod 37 and the front end of slide valve 50, in the normal state. Between slide valve 50 and manual input rod 39, there is airtightly interposed a seal ring 55 fitted in a circumferential slot 39d formed in input rod 39, the seal ring 55 being axially slidable together with input rod 39.

Front small diameter portion 37b of reaction rod 37 has a disc plate 56 slidably fitted thereon, the plate 56 being restricted against forward movement relative to piston 34 by a stop plate 59 secured by screws 58 to a forwardly projected annular seat portion 34h of disc portion 34a of piston 34. Thus, by the front surface of disc portion 34a and the rear surface of disc plate 56, there is defined an inner space which communicates through at least one hole 34j with the inside of projection 34g of piston 34. Further, disc plate 56 has a plurality of holes 56a formed therethrough for free communication of air and a circumferential stepped portion 56b provided with a rearwardly bulged elastic ring member 57 adhered thereto. Disc portion 34a of piston 34 has three small convex portions 34i, and three lever members 60 are interposed between respective convex portions 34i and disc plate 56 so that, when an axial force is exerted by disc plate 56, respective lever members 60 tend to rotate counterclockwise in FIG. 2 about corresponding convex portions 34i, while such rotation of lever member 60 is restricted within a small extent due to large diameter portion 37a of reaction rod 37 and ring member 57.

At the front side of disc plate 56, there is axially disposed an output rod 61 formed coaxially from the rear end thereof with a long hole 61a slidably fitted on front small diameter portion 37b of reaction rod 37 with a proper play left between the bottom of hole 61a and the front end of small diameter portion 37b in the normal state. Output rod 61 is adapted to abut at the rear end on the front side of disc plate 56 in the normal state and to extend forwardly through front casing 30a, with a front portion 61b projecting into a space defined by a rearwardly recessed portion 30h of front casing 30a. Front portion 61b has a joint member 62 screwed therein from the front end and operatively jointed to the master cylinder 18. Between this portion 61b and recessed portion 30h of front casing 30a, there is airtightly fitted a seal ring 63, thereby keeping front chamber $C_1$ airtight.

Figure 4:
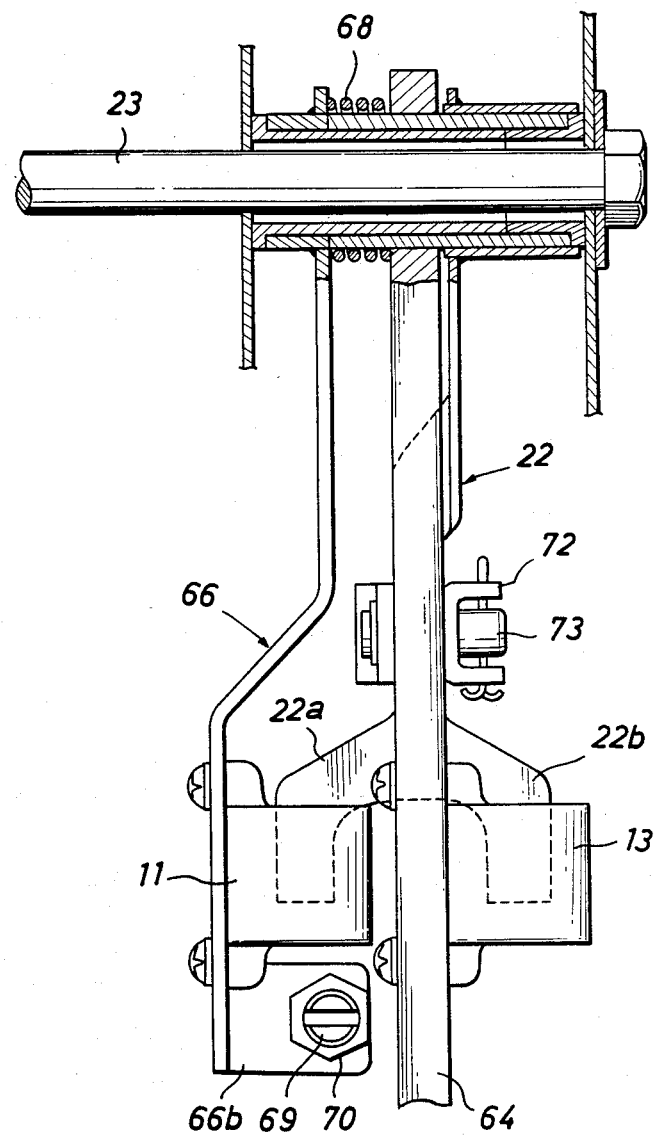
FIG. 4 is a sectional side view of the braking device of FIG. 2.
Figure 5:
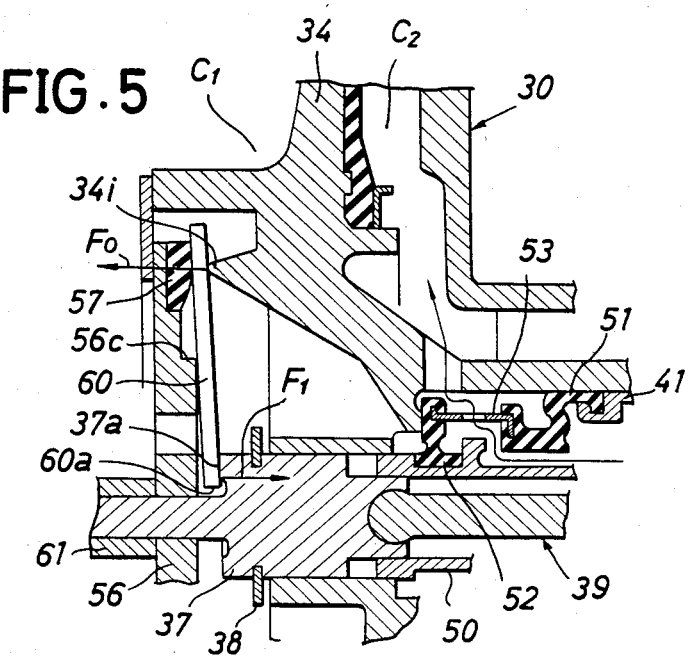
FIGS. 5 and 6 are partial detailed views for explanation of the multiplying device of FIG. 2.

As shown in FIGS. 2~4 on the rear side of multiplying device 16 there is disposed lever 22 forked at the lower end into a pair of arm plates 22a, 22b, a brake pedal lever 64 provided at the lower end with a brake pedal 64a, and a braking force control lever 66, the levers 22, 64, 66 all being rotatable about pivot shaft 23 secured to the vehicle body. Coiled on the shaft 23 is a helical spring 68 normally biasing pedal and control levers 64, 66 to their initial positions as shown in FIG. 2 to be held by the aid of a stop plate 66a provided at the lower end of control lever 66. On the opposite side of stop plate 66a, there is formed at the lower end of control lever 66 a bent plate 66b having an adjustment screw 69 fastened thereto by a nut 70. Screw 69 has an adjustable projection length and at a forward position properly spaced therefrom there is disposed a stopper 71 secured to the vehicle body so that, when control lever 66 is rotated clockwise in FIG. 2, screw 69 abuts against stopper 71.

The solenoids 11, 13 are secured to side surfaces of control and pedal levers 66, 64, respectively, and have respective actuation elements 11a, 13a in abutment with arm plates 22a, 22b, respectively, of the lever 22 which in turn has the front surface abutting at its vertically central portion thereof against the rear end of automatic input rod 41. On the other hand, pedal lever 64 has a channel yoke 72 pivotally supported at the rear end thereof by a pin 73 secured to lever 64 and connected at the front end thereof to the rear end of manual input rod 39 by means of a nut 74.

The manner of operation of the automatic braking system described in connection with the first embodiment wil be explained with respect to four situations, namely, the cases of manual operation, light braking operation, strong braking operation and power failure.

First, the case of manual operation will be explained. As an engine (not shown) of the vehicle is put in service, the pressure in front chamber $C_1$ is kept negative. Before braking operation, valve member 51 is out of contact with projection 34g, thus maintaining both chambers $C_1$, $C_2$ at an even pressure. Therefore, piston 34 is biased by return spring 48 to the original position thereof, as shown in FIG. 2.

When brake pedal 64a is pedaled down by a driver of the vehicle, pedal lever 64 is rotated clockwise in FIG. 2, thus pushing yoke 72, manual input rod 39, sleeve 42, slide valve 50 and reaction rod 37 forwardly against the resilient force of return spring 48. First, valve member 51 seats on projection 34g, thus interrupting the communication between front and rear chambers $C_1$, $C_2$. As slide valve 50 advances, valve member 52 is separated from second flange portion 50b as shown is FIG. 5, thereby permitting atmospheric air to enter from filter 45 via a course illustrated in FIG. 5 into rear chamber $C_2$, with a result that chamber $C_2$ has an atmospheric pressure. The resultant pressure difference between chambers $C_1$, $C_2$ is exerted on disc portion 34a of piston 34, producing a large forward force F and causing piston 34 to advance against return spring 36. As piston 34 advances, each lever member 60 is pushed by a force Fo substantially equal to a third of F and advances together with disc plate 56 and output rod 61, thereby operating master cylinder 18 and local cylinders 20 to brake the wheels.

Then, a rearward reaction proportional to the hydraulic pressure produced in master cylinder 18 pushes output rod 61 and disc plate 56. With a rear shoulder portion 56c of disc plate 56 rearwardly and deformable ring member 57, each lever member 60 is pushed to rotate counterclockwise in FIG. 5 about convex portion 34i, so that the radially inner end 60a of lever member 60 is brought into abutment with large diameter portion 37a of reaction rod 37, thereby pushing this rod 37 with a force $F_1$ which is proportionally transmitted to brake pedal 64a and felt by the driver, while the rest of the reaction force is substantially borne by the pressure difference between chambers $C_1$, $C_2$.

Figure 6:
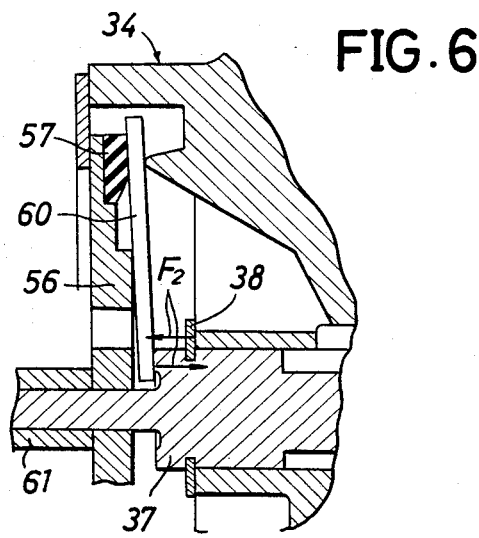

The case of light braking will now be explained. When a light braking signal $S_1$ is transmitted to energize solenoid 11, element 11a moves forwardly to rotate arm plate 22a and lever 22 clockwise in FIG. 2, thereby causing automatic input rod 41 and slide valve 50 to advance slightly, thus having chamber $C_2$ communicated to atmosphere. As a result, piston 34 receives a large forward force F and advances to operate master cylinder 18 as in the above-described first case. However, in this case where, as shown in FIG. 6, all of the reaction force $F_2$ exerted on reaction rod 37 is transmitted to piston 34 by the effect of snap ring 38 in abutment with small cylindrical portion 34f of piston 34 and borne by the pressure difference between chambers $C_1$, $C_2$, no more than a substantially negligible reaction force is transmitted to input rod 41 and solenoid 11 may be of a substantially minimum capacity.

On the other hand, as piston 34 advances, pedal and control levers 64, 66 rotate clockwise in FIG. 2 together with lever 22, while keeping their relative positions. When adjustment screw 69 is brought into abutment with stopper 71, control lever 66 and solenoid 11 secured thereto stop movement. Consequently, when piston 34 and pedal lever 64 have come to their slightly forward positions, input rod 41 retreats relative to input rod 39 by the effect of spring 54 and valve member 52 again seats on second flange portion 50b. Therefore, piston 34 is prevented from effecting further braking, while the degree of light braking may be adjusted by adjustment screw 69.

Under such condition, if the driver actuates brake pedal 64a, the pedal force will be transmitted through yoke 72, input rod 39, reaction rod 37, lever member 60, disc plate 56 and output rod 61 to master cylinder 18, thus giving rise to the braking force. If the driver further actuates pedal 64a, valve member 52 will be again separated from second flange member 50b, thus introducing atmospheric pressure into chamber $C_2$.

When the possibility of collision becomes sufficiently slight, solenoid 11 becomes deenergized and piston 34 retreats to the initial position thereof.

The case of strong braking will be explained hereinbelow.

When solenoid 13 is energized with strong braking signal $S_2$ applied, a maximum braking force determined by the effective projection area of piston 34 and pressure difference between chambers $C_1$, $C_2$ will be exerted upon master cylinder 18 to effect a fast braking, because solenoid 13 is secured to pedal lever 64.

In the case of power failure where the engine is stopped and no negative pressure is supplied to chamber $C_1$, if the driver actuates brake pedal 64a, the pedal force will be transmitted to output rod 61 via input rod 39, reaction rod 37, lever member 60 and disc plate 56. Therefore, even in such bad condition, the braking is possible while no multiplying effect is available.

In this first embodiment, the pedal force multiplying device may be of a hydraulic type.

Figure 7:
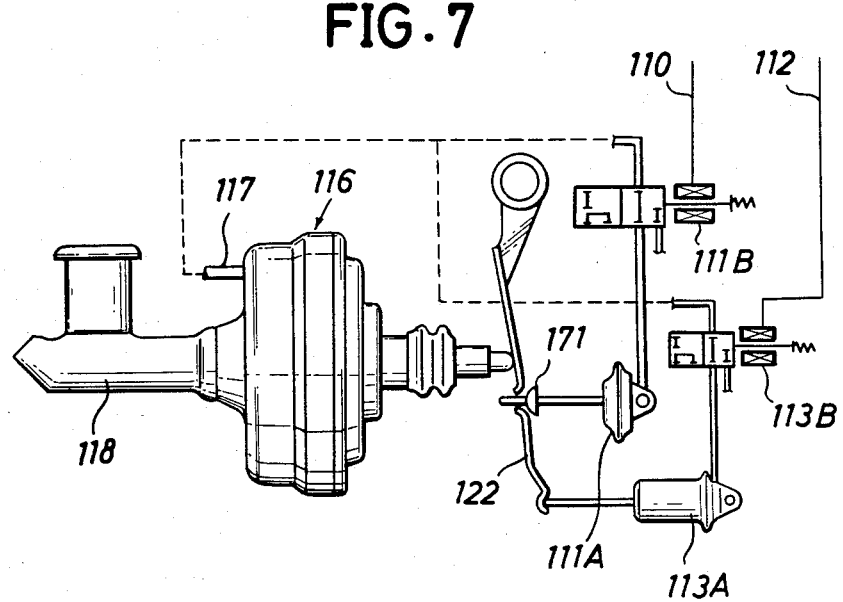
FIG. 7 is a schematic partial view showing a first modified example of the first embodiment of FIG. 1.

Referring now to the first modified example of the first embodiment of the invention shown in FIG. 7, the automatic braking system comprises a pair of negative pressure boosters 111A, 113A controlled for pressure difference across respective diaphragms (not shown) by a pair of solenoids 111B, 113B supplied with the light and strong braking signals $S_1$, $S_2$ in the first embodiment through a pair of signal lines 110, 112, respectively. Boosters 111A, 113A are secured at proper positions on the vehicle body and have substantially elongated actuation elements, while the actuation element of booster 111A has at its medium portion a stopper 171 to thereby adjust the effective length of actuation element. On the front side of lever 122, there is disposed a pedal force multiplying device 116 similar to the multiplying device 16 in the first embodiment. This device 116 is provided with a hose adapter 117 and is operatively connected to a master cylinder 118.

By the use of boosters 111A, 113A, lever 122 is satisfactorily actuated from distant positions in a simple manner. The boosters may have short actuation elements for control from close positions.

Figure 8:
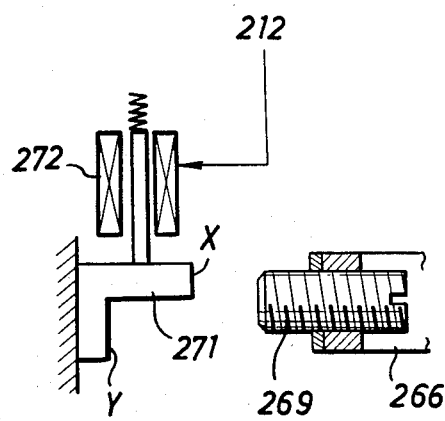
FIG. 8 is a schematic partial view showing a second modified example of the first embodiment of FIG. 1.

Referring now to the second modified example of the first embodiment of the invention shown in FIG. 8, the automatic braking system comprises a stopper 271 controlled by a solenoid 272 supplied through a signal line 212 with a control signal from the system A in the first embodiment. Stopper 271 has two abutment surfaces X, Y varying in distance from a screw 269 fastened to a bent plate 266 of the control lever 66 in the first embodiment.

When the strong braking signal $S_2$ is given, solenoid 272 pulls up stopper 271 to place surface Y instead of surface X in the position against which screw 269 is to abut. Stopper 271 comes down to its initial position when signal $S_2$ goes out. Solenoid 272 may be a control motor or booster. Stopper 271 may have a continuously curved or oblique surface for the abutment with screw 269.

Figure 9:
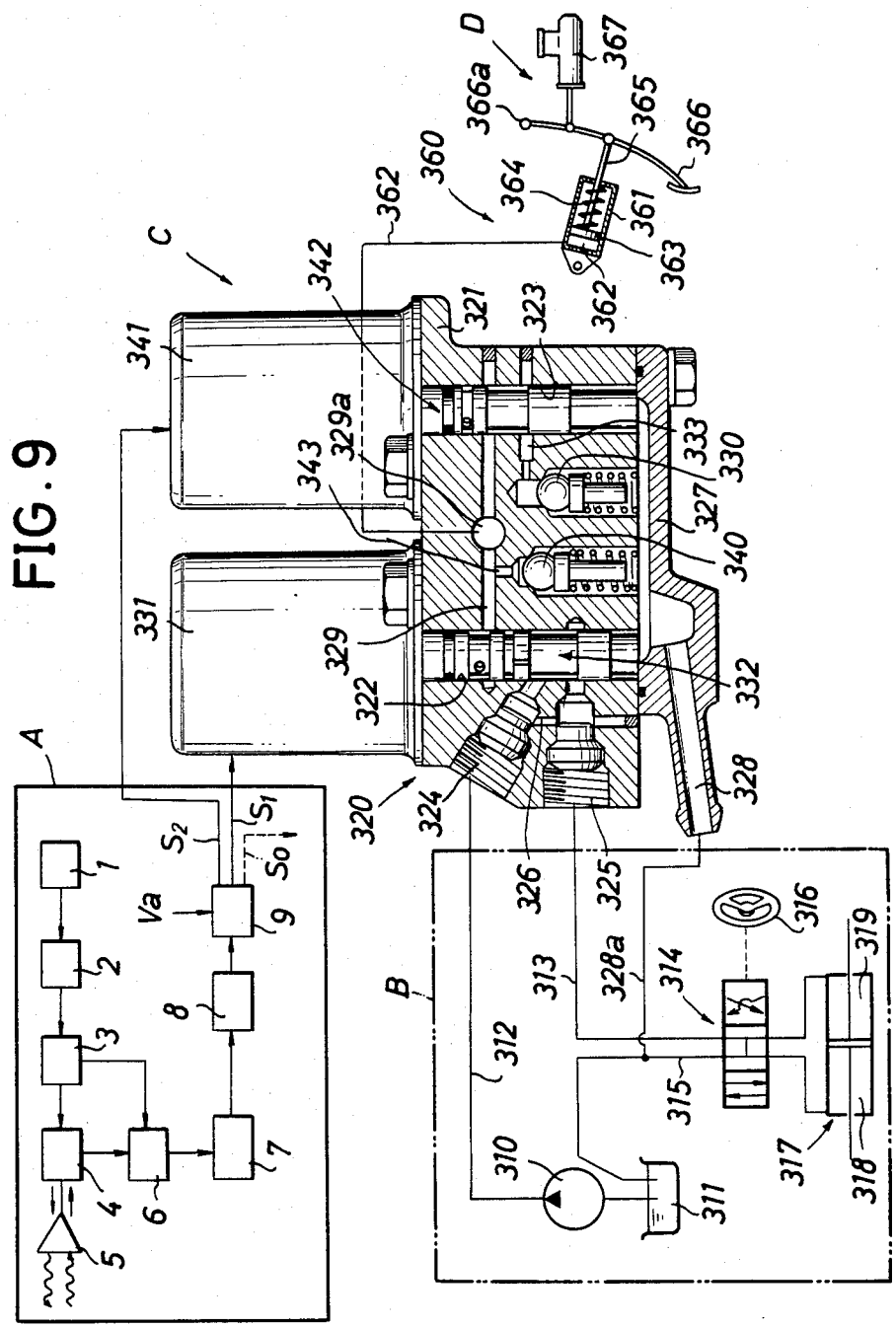
FIG. 9 is a schematic diagrammatical view of an automatic braking system according to a second embodiment of the invention.
Figure 10:
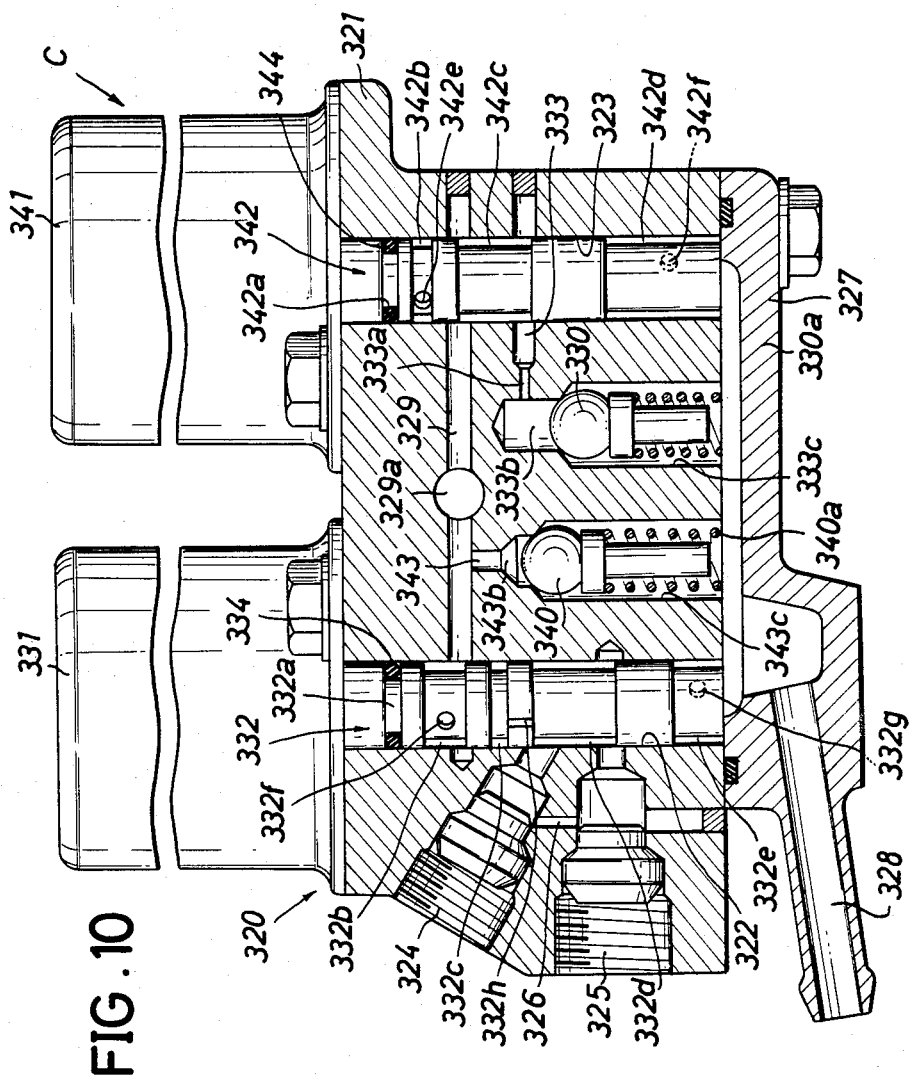
FIG. 10 is a detailed longitudinal sectional view showing a control device of the automatic braking system of FIG. 9.

Referring now to the second embodiment of the invention shown in FIGS. 9 and 10, the automatic braking system comprises an automatic command system A, a hydraulic power system B, a hydraulic braking control device C and a braking device D of the hydraulic type.

In this embodiment, system A is substantially the same as that of the first embodiment and comprises an FM-CW radar system including a carrier oscillator 1, a frequency modulator 2 and a directional coupler 3 before a circulator 4 and an antenna 5 to transmit on FM carrier signal. An echo from an obstacle (not shown) such as a preceding vehicle is sent through antenna 5 and circulator 4 to a mixer 6 supplied with the carrier signal from coupler 3 and followed by a video amplifier 7 and a frequency counter 8 interrogated for beat frequency from a signal processor 9 which is further interrogating a speedometer (not shown) or the like for the absolute velocity Va of the vehicle having the automatic braking system installed therein.

Through the same processing operation as described in connection with the first embodiment, processor 9 outputs the light and strong braking signals $S_1$, $S_2$ as well as the annunciatory signal So in response to the need of braking.

System B is a conventional hydraulic circuit for power steering adapted in this embodiment to serve as a hydraulic energy source of control device C. Accordingly, system B includes an oil pump 310 driven by an engine (not shown) of the vehicle. Pump 310 draws up oil from an oil reservoir 311 and delivers it in the form of a pressure oil into an oil supply line 312 leading via a later-described portion of control device C to another supply line 313 connected with an open-center type four-way directional control valve 314 of the power steering system. As well known in the art, control valve 314 is operatively connected with a steering wheel 316 and adapted to shift sideways in FIG. 9 in response to the steering of wheel 316 so as to selectively connect either of pump 310 or reservoir 311 with either of a pair of cylinder chambers 318, 319 of a power cylinder 317, thereby effecting a power assistance for steering. In such manner, oil is returned through a return line 315 to reservoir 311. As known in the art, pump 310 is provided with a relief valve (not shown) to set a maximum working pressure of oil, as well as a flow control valve (not shown) to stabilize the discharge of pump 310.

Control device C principally comprises a hydraulic control valve 320 including first and second ball valves 330, 340 respectively provided with first and second spool valves 332, 342 respectively controlled by first and second solenoids 331, 341. First solenoid 341 receives light braking signal $S_1$ to actuate first spool vlave 332 so as to provide for device D a predetermined low hydraulic pressure obtained at the first ball valve 330, while strong braking signal $S_2$ is given to second solenoid 341 to thereby actuate second spool valve 342 so as to supply device D with a predetermined high hydraulic pressure obtained at the second ball valve 340. As will be easily understood, ball valves 330, 340 and spool valves 332, 342 may be other types of pressure control and directional control valves, respectively.

Braking device D comprises a hydraulic pedal actuator 360 of a spring-return type interposed between a brake pedal 366 and a body (not shown) of the vehicle. In the extension stroke of actuator 360, pressure oil sent from control device C is introduced into a left chamber 362 defined by a cylinder 361, thus pushing a piston 363 against a spring 364, so that pedal 366 pivotally connected with a piston rod 365 turns about a pivot 366a counterclockwise in FIG. 9 and operates a master cylinder 367 operatively connected with pedal 366, thereby effecting the braking of the vehicle. In this embodiment, the space accommodating spring 364 is in free communication with atmospheric pressure, while chamber 362 comes to communicate with reservoir 311 of system B when both braking signals $S_1$, $S_2$ are interrupted, as later-described. Namely, in the normal state and when device C fails to function, the driver can freely actuate brake pedal 366.

Description will be further detailed hereinbelow in connection with hydraulic braking control drive C.

As shown in FIG. 10, control valve 320 has a body 321 formed with first and second cylinder portions 322, 323. First cylinder portion 321 has spool valve 332 fitted therein to be vertically slidable together with an operation shaft (not shown) of first solenoid 331. Spool valve 332 placed in its normal lowermost position thereof in FIG. 10 is formed in the outer surface thereof with five annular slots 332a~332e axially spaced apart relative to each other. Uppermost first slot 332a has a seal ring 334 fitted therein to assure a favorable sealing with respect to the inner wall of cylinder portion 322, and second and lowermost fifth slots 332b, 332e communicate with each other through small holes 332f, 332g formed therein respectively and a communication path (not shown) axially provided in spool valve 332. Third and fourth slots 332c, 332d communicate with each other by a slot orifice 332h. Body 321 of control valve 320 further includes a pair of communication holes 324, 325 respectively connected to supply lines 312, 313 of hydraulic power system B. Holes 324, 325 are both open to cylinder portion 322, while communicating with each other through an orifice 326. Accordingly, in the normal state, supply lines 312, 313 communicate with each other through fourth slot 332d of spool valve 332. On the bottom of body 321, there is provided a bottom cover 327 formed therein with a path 328 communicating on the one side with fifth slots 332e of spool valve 332 and on the other side with a return line 328a which is connected through return line 315 with oil reservoir 311 in system B. Between first and second cylinder portions 322, 323 there is formed a long path 329 connecting them with each other and having at the longitudinally central part an output port 329a connected to cylinder chamber 362 of pedal actuator 360. As shown in FIG. 10, in the normal state, output port 29a is kept in communication with reservoir 311, but out of communication with supply lines 314, 315. Normally, port 329a communicates with reservoir 311 through second slot 332b of spool valve 332 facing port 392a, small holes 332f, 332g, fifth slot 332e, path 328 and return lines 328a, 315.

On the other hand, second spool valve 342 is formed with four annular slots 342a~342d axially spaced apart from each other, namely, uppermost first slot 342a provided with a seal ring 344 fitted thereon, second and lowermost fourth slots 342b, 342d communicating with each other through respective small holes 342e, 342f and a communication path (not shown) axially provided in spool valve 342, and third slot 342c which in the normal state is kept in communication with a connection path 333 leading via an orifice 333a to an upper chamber 333b of first ball valve 330. Accordingly, output port 329a communicates with chamber 333b through third slot 342c. First ball valve 330 is normally biased upwardly by a spring 330a, thus separating upper chamber 333b from a large-diameter lower chamber 333c held in communication with path 328. Further, elongated path 329 has a branch 343 opened in an upper chamber 343b of second ball valve 340. This valve 340 is normally biased upwardly, thus separating upper chamber 343b from a large-diameter lower chamber 343c with path 328, similarly to first ball valve 330. As a result upper chambers 333b, 343b communicate with each other in the normal state, and lower chambers 333c, 343c are always in communication with each other. Moreover, the valve-opening pressure of second ball valve 340 is predetermined to be higher than that of first ball valve 330.

When solenoid 331 is energized with light braking signal $S_1$ applied, spool valve 332 moves upwardly and path 329 becomes disconnected from slot 332b and communicated with slot 332c, thus allowing hydraulic pressure to prevail from line 312 through hole 324, slot 332d and orifice 332h into path 329, while spool valve 332 stops hole 325 which in turn receives a hydraulic pressure reduced through orifice 326. Namely, the oil pressure in line 312 before orifice 326 is applied through orifice 332h and path 329 to first and second ball valves 330, 340 and simumtaneously to actuator 360 which is then operated for light braking with a pressure set at the ball valve 330.

In the operation described above, if the driver actuates pedal 366, the pedal force is favorably added to the action of actuator 360, thus effecting a stronger braking.

Further, when solenoid 341 is operated with strong braking signal $S_2$ applied, spool valve 342 moves upwardly, stopping path 333. As a result, path 329 has a higher oil pressure set at the second ball valve 340 and led into actuator 362 which is thus further operated so as to effect a strong braking of the vehicle.

It is to be understood that between paths 328, 329 there may be added another set of ball and spool valves, thereby increasing the number of control steps. Moreover, the hydraulic pressure source may be of any type.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of invention is indicated by the appended claims rather than by the foregoing description.

We claim:

1. An automatic braking system for a vehicle, comprising:
   automatic command system means for giving a command including at least one braking signal of a level in response to the need for braking;
   a fluid pressure source;
   a braking device having an input member which is manually actuatable;
   control means for actuating said input member by applying thereto a fluid pressure from said pressure source in response to said level of said braking signal;
   said fluid pressure comprising a pneumatic pressure supplied to said control means;
   said input member comprising a brake pedal and a master cylinder;
   said control means comprising a multiplying device operatively connected with said brake pedal and said master cylinder;
   said multiplying device including a piston operable with a pressure difference thereacross and a feedback route partially feeding back a reaction from said master cylinder to said brake pedal;
   said pressure difference being applicable to said piston in response to said braking signal by way of a first operation route operatively independent of a second operation route for applying said pressure difference to said piston in response to a pedal force from said brake pedal;
   said pressure difference being controlled by a control valve operable with either of said first and second operation routes;
   said brake pedal comprising a manual lever member operatively connected to said second operation route and adapted to be manually rotatable, an automatic lever member operatively connected to said first operation route and rotated according to said braking signal, and a control lever member controlling movement of said automatic lever member according to the strength of said braking signal; and
   a spring means connecting said manual lever member with said control lever member such that said control lever member remains relatively stationary over a portion of the path of movement of said manual lever member.

2. A system according to claim 1, wherein:
   said command comprises two said braking signals and an annunciatory signal, said signals being given by said command system means in response to measurement of a velocity between said vehicle and an obstacle in front thereof and an absolute velocity of said vehicle.

3. A system according to claim 1, wherein:
   said feed back route is operatively parallel with said first and second operation routes.

4. A system according to claim 1, wherein:
   a stopper member operatively cooperating with said control lever to stop movement thereof at a selectively predetermined position.

5. An automatic braking system for a vehicle, comprising:
   an automatic command system giving a command including at least one braking signal of a level in response to the need for braking;

a pedal force multiplying device having a control valve for controlling the operation thereof;

a brake pedal including a lever, said brake pedal being adapted to be manually operated by a driver;

an automatic brake lever disposed adjacent said brake pedal lever;

a pair of input rods including a manual input rod and an automatic input rod;

said manual input rod having a first end connected to said brake pedal lever and a second end operatively connected to said control valve of said multiplying device;

said automatic input rod having a first end operatively cooperating with said automatic brake lever and a second end operatively connected to said control valve of said multiplying device;

a control lever operatively cooperating with said brake pedal lever and said automatic brake lever;

said brake pedal lever, said automatic brake lever and said control lever being rotatably connected to one common axis;

a spring means for urging said brake pedal lever and said control lever to move concurrently with each other upon operation of said brake pedal;

a stopper member for stopping said control lever against the urging force of said spring means when the movement of said brake pedal lever exceeds a predetermined range;

a first actuator carried on said brake pedal and adapted to actuate said automatic brake lever in response to a braking signal; and a second actuator carried on said control lever and adapted to actuate said automatic brake lever in response to a second braking signal.

6. A system according to claim 5, wherein:

said manual input rod is substantially hollow; and said automatic input rod is arranged coaxially within said manual input rod.

7. A system according to claim 5, wherein:

said multiplying device is provided with a reaction feedback mechanism operatively associated with only said manual input rod of said pair of input rods.

* * * * *